United States Patent [19]

Stepp et al.

[11] Patent Number: 5,434,234
[45] Date of Patent: Jul. 18, 1995

[54] ORGANO(POLY)SILOXANES, THEIR PREPARATION AND THEIR USE

[75] Inventors: Michael Stepp; Johann Mueller, both of Burghausen, Germany

[73] Assignee: Wacker-Chemie GmbH, Munich, Germany

[21] Appl. No.: 117,099

[22] PCT Filed: Apr. 22, 1992

[86] PCT No.: PCT/FR92/00899
§ 371 Date: Sep. 13, 1993
§ 102(e) Date: Sep. 13, 1992

[87] PCT Pub. No.: WO92/19667
PCT Pub. Date: Nov. 12, 1992

[30] Foreign Application Priority Data

Apr. 25, 1991 [DE] Germany ............ 41 13 554.7

[51] Int. Cl.$^6$ .................. C08G 77/12; C08G 77/18; C08L 83/05
[52] U.S. Cl. .................................... 528/31; 528/33; 528/34
[58] Field of Search ........................... 528/31, 33, 34

[56] References Cited

U.S. PATENT DOCUMENTS

| | | |
|---|---|---|
| 3,334,067 | 8/1967 | Weyenberg . |
| 3,445,426 | 5/1969 | Chi-Long Lee . |
| 3,481,898 | 12/1969 | Davies et al. . |
| 3,708,467 | 1/1973 | Smith et al. . |
| 4,434,283 | 2/1984 | Sattlegger et al. . |
| 4,755,578 | 7/1988 | Lucas . |
| 4,942,211 | 7/1990 | Sommer et al. . |
| 5,049,617 | 9/1991 | Yoshioka et al. . |
| 5,188,750 | 2/1993 | Kogure et al. . |

FOREIGN PATENT DOCUMENTS

| | | |
|---|---|---|
| 0022976 | 1/1981 | European Pat. Off. . |
| 0311061 | 4/1989 | European Pat. Off. . |
| 0331753 | 9/1989 | European Pat. Off. . |
| 0338577 | 10/1989 | European Pat. Off. . |
| 0362710 | 4/1990 | European Pat. Off. . |
| 1770140 | 7/1970 | France . |
| 1720496 | 4/1972 | France . |
| 3801389 | 7/1989 | France . |
| 3932231 | 3/1990 | France . |
| 3939482 | 5/1990 | France . |
| 4029481 | 3/1992 | France . |

OTHER PUBLICATIONS

Ullmanns Encyklopädie der technischen Chemie, 4th Edition, 1982, vol. 21, pp. 285 ff., Verlag Chemie, Weinheim.
Literal translation to DE 40 29 481.

*Primary Examiner*—James J. Bell
*Assistant Examiner*—Helen F. Lee
*Attorney, Agent, or Firm*—Martin Connaughton

[57] ABSTRACT

The description relates to novel organo(poly)siloxanes of the general formula (I): $(R^1O)_a HSiR_{2-a}O[SiR_2O]_n SiR_2R^2$, in which R and $R^2$ are the same or different and represent a monovalent, possibly substituted hydrocarbon radical; $R^1$ is the same or different and represents a monovalent, possibly substituted hydrocarbon radical; n is a whole number of at least 2; and a is 1 or 2. The organo(poly)siloxanes are used as additives in materials which can be cross-linked to form organopolysiloxane elastomers.

9 Claims, No Drawings

ORGANO(POLY)SILOXANES, THEIR PREPARATION AND THEIR USE

The invention relates to organo(poly)siloxanes, to their preparation and to their use.

Linear organo(poly)siloxanes containing different terminal groups, where one terminal group is a triorganosiloxy group and one terminal group is a condensable group, such as a hydroxyl or alkoxy group, are disclosed, for example, in EP-A 311 061 (laid-open 12 April 1989, Ona Isao et al., Toray Silicone Company), DE-A 39 39 482 (laid-open 31 May 1990, Kogure et al., Kansai Paint Co.) and DE-A 39 32 231 (laid-open 29 Mar. 1990, Yoshioka et al., Shin-Etsu Chemical Co.).

The invention relates to organo(poly)siloxanes of the general formula $$(R^1O)_a HSiR_{2-a}O[SiR_2O]_n SiR_2R^2 \quad (I)$$

in which R and $R^2$ are in each case identical or different and are monovalent, optionally substituted hydrocarbon radicals, $R^1$ is identical or different and is a monovalent, optionally substituted hydrocarbon radical, n is an integer of at least 2 and a is 1 or 2.

R and $R^2$ are preferably monovalent, optionally substituted hydrocarbon radicals having 1 to 13 carbon atom(s) per radical.

$R^1$ is preferably an alkyl radical having 1 to 13 carbon atom(s) per radical, which may be substituted by an ether oxygen atom.

n is preferably an integer from 3 to 1,000, preferably from 9 to 100.

Although not shown by the formula (I), up to 5 mol per cent of the diorganosiloxane units may be replaced by other siloxane units, such as, for example, $RSiO_{3/2}$ and/or $SiO_{4/2}$ units, where R is as defined above. In addition, the organo(poly)siloxanes of the formula (I)—although again not shown in the formula (I)—may, as a consequence of the preparation, contain up to 20 mol percent of other functional groups, such as, for example, hydroxyl groups. Furthermore, the organo(poly)siloxanes according to the invention, although not indicated in the formula (I), may, as a consequence of the preparation, also contain a small amount of —OSiH(OR$^1$) groups or (R$^1$O)SiR$_2$ groups, where R and R$^1$ are as defined above.

Examples of hydrocarbon radicals R and $R^2$ are alkyl radicals, such as the methyl, ethyl, n-propyl, isopropyl, n-butyl, isobutyl, tert.-butyl, n-pentyl, isopentyl, neopentyl and tert.-pentyl radicals, hexyl radicals, such as the n-hexyl radical, heptyl radicals, such as the n-heptyl radical, octyl radicals, such as the n-octyl radical, and iso-octyl radicals, such as the 2,2,4-trimethylpentyl radical, nonyl radicals, such as the n-nonyl radical, decyl radicals, such as the n-decyl radical, and dodecyl radicals, such as the n-dodecyl radical; alkenyl radicals, such as the vinyl and allyl radicals; cycloalkyl radicals, such as cyclopentyl, cyclohexyl and cycloheptyl radicals, and methylcyclohexyl radicals; aryl radicals, such as the phenyl and naphthyl radicals; alkaryl radicals, such as o-, m-, p-tolyl radicals, xylyl radicals and ethylphenyl radicals; aralkyl radicals, such as the benzyl radical and the alpha- and the β-phenylethyl radicals.

Examples of substituted hydrocarbon radicals are haloalkyl radicals, such as the 3,3,3-trifluoro-n-propyl radical, 2,2,2,2',2'2'-hexafluoroisopropyl radical and the heptafluoroisopropyl radical; haloaryl radicals, such as the o-, m- and p-chlorophenyl radical; and acyloxyalkyl radicals, such as the acetoxyethyl radical and the (meth)acryloxypropyl radical.

Examples of alkyl radicals R and $R^2$ apply fully to alkyl radicals $R^1$. Examples of alkyl radicals $R^1$ which are substituted by an ether oxygen atom are alkoxyalkyl radicals, such as the methoxyethyl and ethoxyethyl radicals.

R is preferably an alkyl radical, particularly preferably a methyl radical.

$R^1$ is particularly preferably an ethyl radical.

$R^2$ is preferably an alkyl radical, alkenyl radical or substituted hydrocarbon radical, but particularly preferably a methyl, vinyl, allyl or (meth)acryloxypropyl radical.

Examples of organo(poly)siloxanes according to the invention are those of the formulae
$(MeO)_2HSiO[SiMe_2O]_nSiMe_3$,
$(EtO)_2HSiO[SiMe_2O]_nSiMe_3$,
$(MeO)_2HSiO[SiMe_2O]_nSiMe_2CH=CH_2$,
$(EtO)_2HSiO[SiMe_2O]_nSiMe_2CH=CH_2$, $$(MeO)_2HSiO[SiMe_2O]_nSiMe_2(CH_2)_3O\underset{\underset{O}{\|}}{C}CH=CH_2,$$

$$(EtO)_2HSiO[SiMe_2O]_nSiMe_2(CH_2)_3O\underset{\underset{O}{\|}}{C}CH=CH_2,$$

$$(MeO)_2HSiO[SiMe_2O]_nSiMe_2(CH_2)_3O\underset{\underset{O}{\|}}{C}CMe=CH_2 \text{ and}$$

$$(EtO)_2HSiO[SiMe_2O]_nSiMe_2(CH_2)_3O\underset{\underset{O}{\|}}{C}CMe=CH_2,$$

where Me is a methyl radical, Et is an ethyl radical and n is as defined above.

The organo(poly)siloxanes according to the invention have a viscosity of, preferably, from 1 to 10,000 mPa.s at 23° C.

The organo(poly)siloxanes according to the invention are preferably prepared by reacting an α-hydroxyorgano(poly)siloxane of the formula $$R^2R_2Si[OSiR_2]_nOH \quad (II)$$

with a silane of the formula $$(R^1O)_a HSiR_{2-a}X \quad (III),$$

in which R, $R^1$, $R^2$, n and a are as defined above, and X is an easily removable group.

X is preferably a chlorine atom or a group of the formula $$-OR^1, \quad -\underset{\underset{R}{\|}}{N}-\underset{\underset{O}{\|}}{C}-R, \quad -O-\underset{\underset{O}{\|}}{C}-R$$

and $-NR_2$, preferably $-OR^1$, where R and $R^1$ are as defined above

Although not shown by the formula (II), up to 5 mol percent of the diorganosiloxane units may be replaced by other siloxane units, such as, for example, $RSiO_{3/2}$ and/or $SiO_{4/2}$ units, where R is as defined above.

Examples of α-hydroxyorgano(poly)siloxanes of the formula (II) employed in the process according to the invention are those of the formulae Me$_3$Si[OSiMe$_2$]$_n$OH,
(CH$_2$=CH)Me$_2$Si[OSiMe$_2$]$_n$OH,

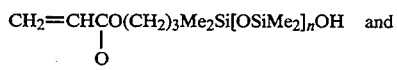

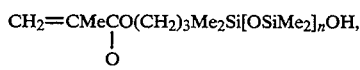

where Me is a methyl radical, Et is an ethyl radical and n is as defined above.

The α-hydroxyorgano(poly)siloxanes employed in the process according to the invention preferably have a viscosity at 23° C. of from 1 to 10,000 mPa.s, preferably from 10 to 1,000 mPa.s.

The α-hydroxyorgano(poly)siloxane of the formula (II) employed in the process according to the invention may be a single type or a mixture of at least two different types of such α-hydroxyorgano(poly)siloxanes.

The α-hydroxyorgano(poly)siloxanes of the formula (II) employed in the process according to the invention can be prepared by known processes by ring-opening polymerisation of hexaorganocyclotrisiloxanes (for example DE-B 1 720 496, DE-B 1 770 140, EP-A 331 753, EP-A 338 577 and EP-A 362 710).

Examples of silanes of the formula (III) which are employed in the process according to the invention are hydridotriethoxysilane, hydridotrimethoxysilane, hydridomethyldiethoxysilane, hydridomethyldimethoxysilane and hydridovinyldimethoxysilane.

In the process according to the invention, the silane of the formula (III) is preferably employed in an amount of from 1 to 10 mol, preferably in an amount of from 1 to 4 mol, in each case based on 1 mol of the α-hydroxyorgano(poly)siloxane of the formula (II).

The silane of the formula (III) employed in the process according to the invention may be a single type or a mixture of at least two different types of such silanes.

The silanes of the formula (III) employed in the process according to the invention are commercially available products or can be prepared by processes known to persons skilled in the art. Reference may be made here, for example, to M. Wick, G. Kreis, F. -H. Kreuzer, "Silicone" [Silicones], in "Ullmanns Encyklopädie der technischen Chemie" [Ullmann's Encyclopaedia of Industrial Chemistry], Verlag Chemie, Weinheim, 4th Edition, 1982, Vol. 21, pages 485 ff.

The novel reaction of an α-hydroxyorgano(poly)siloxane of the formula (II) with a silane of the formula (III) is preferably carried out in the presence of a catalyst.

Examples of catalysts employed in the process according to the invention are acids, such as, for example, hexanoic acid, 2-ethylhexanoic acid, lauric acid and malonic acid, bases, such as, for example, quinoline, and compounds containing enolisable groups, such as, for example, coumaranone, dihydrocoumarin, phenols, such as, for example, 2,6-di-tert.-butyl-4-methylphenol, 1,3-bicarbonyl compounds, such as, for example, pentanedione and benzoylacetone, carboxylic esters, such as, for example, propyl acetate and allyl acetoacetate, and carboxylic acid salts, such as, for example, calcium octanoate.

The catalyst is preferably employed in the process according to the invention in amounts of from 0 to 2 percent by weight, particularly preferably from 0 to 1 percent by weight, in each case based on the total weight of α-hydroxyorgano(poly)siloxane of the formula (II) employed.

The process according to the invention is preferably carried out at a temperature of from 23° to 220° C., particularly preferably from 50° to 140° C., and at the pressure of the ambient atmosphere, i.e. at about 1020 hPa, but can also be carried out at higher or lower pressures.

The process according to the invention has the advantage that the organo(poly)siloxanes according to the invention can be prepared simply, substantially selectively, using short reaction times and in high yields.

The organo(poly)siloxanes according to the invention are distinguished, compared with the known organopolysiloxanes which contain hydrolysable and condensation crosslinkable groups at a chain end, by the more reactive terminal hydridoalkoxysiloxy groups, which causes crosslinking in a surprisingly short time in the presence of moisture, it being unnecessary to additionally use metal catalysts, such as tin compounds, to accelerate the crosslinking rate. The crosslinking can be accelerated by additionally using catalytic amounts of Brönsted acids, such as acetic acid, oleic acid or stearic acid.

As a consequence of the high reactivity of the terminal hydridoalkoxysiloxy group with moisture, the organo(poly)siloxanes according to the invention can be employed in all cases where this property is desired.

The organo(poly)siloxanes according to the invention are suitable as additives in compositions which can be crosslinked to give organopolysiloxane elastomers. The organo(poly)siloxanes according to the invention are preferably added to the crosslinkable compositions as plasticisers and/or as agents for improving the adhesion of the elastomers to substrates on which they have been produced, so-called adhesion promoters.

The crosslinkable compositions to which the organo(poly)siloxanes according to the invention are added are preferably organopolysiloxane compositions which have a long shelf life in the absence of water, but crosslink to form elastomers on contact with water at room temperature. Preference is given to compositions of this type which contain (1) an organopolysiloxane containing condensable terminal groups,
(2) an organosilicon compound which contains at least three hydrolysable groups bonded directly to silicon per molecule and optionally
(3) a condensation catalyst.

Particular preference is given to organopolysiloxane compositions which can be crosslinked to give elastomers with elimination of alcohols. Such compositions are sufficiently well known to a person skilled in the art and are described, for example, in the German application with the file reference P 40 29 481.1, U.S. Pat. No 3,334,067, DE-A 38 01 389, U.S. Pat. No. 3,708,467 and U.S. Pat. No. 4,755,578.

In order to accelerate the moisture-crosslinking, the organo(poly)siloxanes according to the invention can be added to the crosslinkable compositions as a mixture with catalytic amounts of Bränsted acids, such as acetic acid, oleic acid or stearic acid.

Other crosslinkable compositions to which the organo(poly)siloxanes according to the invention are added are preferably organopolysiloxane compositions which are crosslinkable through the addition reaction of Si-bonded hydrogen with SiC-bonded radicals containing an aliphatic carbon-carbon multiple bond. Presence is given to such compositions which contain (4) an organopolysiloxane containing SiC-bonded radicals having an aliphatic-carbon-carbon multiple bond, in particular an organopolysiloxane containing SiC-bonded vinyl groups, (5) an organopolysiloxane containing SiC-bonded hydrogen atoms, (6) a catalyst and optionally (7) an inhibitor.

Such compositions are sufficiently well known to a person skilled in the art and are described, for example, in the German application having the file reference P 40 25 281.7, U.S. Pat. No. 4,855,378 and CA-A 11 80 482.

Finally, preferred crosslinkable compositions to which the organo(poly)siloxanes according to the invention are added are organopolysiloxane compositions in which the crosslinking takes place by means of agents which form free radicals. Examples of such agents are peroxidic compounds, such as acyl peroxides, for example dibenzoyl peroxide, bis(4-chlorobenzoyl) peroxide and bis(2,4-dichlorobenzoyl) peroxide; alkyl peroxides and aryl peroxides, such as di-tert.-butyl peroxide and dicumyl peroxide; perketals, such as 2,5-bis(tert.-butylperoxy)-2,5-dimethylhexane; peresters, such as diacetyl peroxydicarbonate, tert.-butyl perbenzoate and tert.-butyl perisononanoate; tert.-butyl-beta-hydroxyethyl peroxide; and azo compounds known as agents which form free radicals, such as azoisobutyronitrile.

The organo(poly)siloxanes according to the invention are preferably added to the crosslinkable compositions in amounts of from 1 to 60% by weight, preferably from 2 to 30% by weight, in each case based on the total weight of the crosslinkable compositions.

The organo(poly)siloxanes according to the invention may furthermore be used to modify organic polymers, such as polyvinyl chloride, polyurethanes, polyamides and polyacrylates, for example as impact modifiers or plasticisers, or for coating surfaces, for example as a constituent of de-icing agents or release agents, such as tire release agents.

EXAMPLE 1

A mixture of 96 g (0.08 mol) of an α-hydroxyorganopolysiloxane of the average formula $(CH_3)_3Si[OSi(CH_3)_2]_{15}OH$, 49.2 g (0.1 mol) of triethoxysilane and 0.72 g (3.6 mmol) of 2,6-bis(tert.-butyl)-4-methylphenol was stirred at 100° C. for one hour. The volatile constituents were removed at 60° C. and 5 mbar on a rotary evaporator, leaving 103.5 g of a clear, colourless oil, whose $^{29}$Si-NMR spectrum gave the following structure:

$(CH_3)_3Si[OSi(CH_3)_2]_{15}OSiH(OC_2H_5)_2$

EXAMPLE 2

A mixture of 96 g (0.08 mol) of an α-hydroxyorganopolysiloxane of the average formula $(H_2C=CH)(CH_3)_2Si[OSi(CH_3)_2]_{15}OH$, 49.2 g (0.1 mol) of triethoxysilane and 0.72 g (3.6 mmol) of 2,6-bis(tert.-butyl)-4-methylphenol was stirred at 100° C. for one hour. The volatile constituents were removed at 60° C. and 5 mbar on a rotary evaporator, leaving 103.5 g of a clear, colourless oil, whose $^{29}$Si-NMR spectrum gave the following structure:

$(H_2C=CH)(CH_3)_2Si[OSi(CH_3)_2]_{15}OSiH(OC_2H_5)_2$

EXAMPLE 3

A mixture of 32.4 g (0.1 mol) of an α-hydroxyorganopolysiloxane of the average formula $(H_2C=CH)(CH_3)_2Si[OSi(CH_3)_2]_3OH$, (preparation in accordance with DE-B 29 18 312 by reacting hexamethylcyclotrisiloxane with vinyldimethylchlorosilane and subsequent hydrolysis of the reaction product $(H_2C=CH)$ $(CH_3)_2Si[OSi(CH_3)_2]_3Cl)$, 32.8 g (0.2 mol) of triethoxysilane and 0.3 g of 2,6-bis(tert.-butyl)-4-methylphenol was stirred at 100° C. for one hour. The mixture was cooled to 30° C. and evaporated in vacuo at 10 mbar on a rotary evaporator, leaving, as residue, 44.0 g of a clear oil, whose $^{29}$Si-NMR spectrum and $^1$H-NMR spectrum gave the following structure:

$(H_2C=CH)(CH_3)_2Si[OSi(CH_3)_2]_4OSiH(OC_2H_5)_2$

EXAMPLE 4

An organopolysiloxane composition which cures on contact with (atmospheric) moisture was obtained by blending 60 parts by weight of an α, ω-dihydroxydimethylpolysiloxane having a viscosity of 80,000 mPa.s at 23° C., 46 parts by weight of the H-alkoxy-functional organopolysiloxane obtained in Example 1, 11.5 parts by weight of a silicone resin containing Si-bonded ethoxy groups and prepared by reacting 164 parts by weight of triethoxysilane with 13.5 parts by weight of water in the presence of 100 ppm by weight of acetic acid, 11.5 parts by weight of pyrogenic silica (commercially available under the trade name Aerosil R972 from Degussa) and 0.5 part by weight of oleic acid (commercially available from Merck).

For complete vulcanisation, the composition is left to cure in a 2 mm thick layer at room temperature for two weeks in air. The mechanical values of the elastomer were then measured on suitable test specimens. The extractable content is determined by swelling the test specimens, cut into small pieces, in toluene (5 days at room temperature). The results are shown in Table 1.

Comparative experiment 1:

The procedure of Example 3 was repeated, with the difference that 46 parts by weight of a dimethylpolysiloxane which is terminally blocked by trimethylsiloxy groups and has a viscosity of 100 mPa.s at 23° C. were used in place of the 46 parts by weight of the H-alkoxy-functional organopolysiloxane. The results are shown in Table 1.

Comparative experiment 2:

The procedure of Example 3 was repeated, with the difference that 46 parts by weight of the α, ω-dihydroxydimethylpolysiloxane having a viscosity of 80,000 mPa.s at 23° C. were used in place of the 46 parts by weight of the H-alkoxy-functional organopolysiloxane. The results are shown in Table 1.

TABLE 1

| | Example 4 | Comparative experiment 1 | Comparative experiment 2 |
|---|---|---|---|
| Shore A hardness | 26 | 28 | 45 |
| Tear strength (N/mm$^2$) | 1.3 | 1.4 | — |
| Elongation at break (%) | 320 | 350 | — |
| Tear propagation strength (N/mm) | 4.4 | 4.3 | — |
| Extractable content (% by weight) | 13.5 | 38.0 | 4.0 |

Taking into account the blank value in comparative experiment 2 (without plasticiser) for extractable constituents, the proportion of exudable plasticiser in comparative experiment 1 (conventional plasticiser) is 3.2 times higher than in Example 4 (plasticiser according to the invention). By contrast, the mechanical properties of the elastomer are not affected.

EXAMPLE 5 a) Component A 58.9 g of an α, ω-divinyldimethylpolysiloxane having a chain length of about 900 siloxane units and a viscosity of 20,000 mPa.s, 33 g of quartz sand (commercially available under the name Silbond 600TST from Quarzwerke GmbH, D-5020 Frechen), 0.005 g of H$_2$PtCl$_6$. 6H$_2$O mixed with 0.2 g of isopropanol and 0.25 g of 1,3-divinyltetramethyldisiloxane were mixed thoroughly.

b) Component B 50.9 g of an α, ω-divinyldimethylpolysiloxane having a chain length of about 900 siloxane units and a viscosity of 20,000 mPa.s, 19.3 g of silylated silica (commercially available under the name T30 from Wacker-Chemie GmbH, D-8000 Munich), 19.3 g of quartz sand (commercially available under the name Silbond 600TST from Quarzwerke GmbH, D-5020 Frechen), 7 g of a copolymer made from trimethylsiloxane, dimethylsiloxane and methylhydridosiloxane units in a molar ratio between the dimethylsiloxane units and the methylhydridosiloxane units of 1:1, and having a viscosity of 60 mPa.s, and 0.175 g of 1-ethinylcyclohexanol were mixed thoroughly.

A mixture of 2.5 g of the above-described component A and 2.5 g of the above-described component B was mixed with 0.4 g of the organopolysiloxane whose preparation is described in Example 3, and the mixture cured fully on the substrates indicated in Table 2 within 1 hour at 40° C. or 80° C. The adhesion was tested in a tear test. The results are shown in Table 2. The extra addition of 0.05 g of acetic acid to the above-described mixture allowed good adhesion to be achieved even on plastics immediately after vulcanisation.

TABLE 2

| Substrate | Condition | Result |
|---|---|---|
| Glass | 1 h/80° C. | Cohesive fracture |
| | 1 h/40° C. | Cohesive fracture |
| Aluminium | 1 h/80° C. | Cohesive fracture |
| | 1 h/40° C. | Cohesive fracture |
| Polycarbonate | 1 h/80° C. | Cohesive fracture |
| | 1 h/40° C. | No adhesion |
| Polyamide | 1 h/80° C. | Cohesive fracture |
| | 1 h/40° C. | Cohesive fracture |
| Polyepoxy resin | 1 h/80° C. | Cohesive fracture |
| | 1 h/40° C. | Cohesive fracture |
| Rigid PVC | 1 h/80° C. | Cohesive fracture |
| | 1 h/40° C. | No adhesion |

Cohesive fracture = fracture in the elastomer

We claim:

1. Organo(poly)siloxanes of the general formula $$(R^1O)_a HSiR_{2-a}O[SiR_2O]_n SiR_2 R^2 \qquad (I)$$

in which R and R$^2$ are in each case monovalent hydrocarbon radicals or substituted monovalent hydrocarbon radicals, R$^1$ is a monovalent hydrocarbon radical or a substituted monovalent hydrocarbon radical, n is an integer of at least 2 and a is 1 or 2.

2. The organo(poly)siloxanes of claim 1, in which n is an integer between 3 and 1,000.

3. An organopoylsiloxane composition which can be crosslinked to form an organopolysiloxane elastomer containing the organo(poly)siloxane of claim 1 as an additive.

4. The organopolysiloxane composition of claim 3, wherein the organopolysiloxane composition has a long shelf life in the absence of water, but crosslinks to form an elastomer when exposed to water at room temperature.

5. The organopolysiloxane composition of claim 3, wherein the organopolysiloxane composition can be crosslinked through the addition reaction of Si-bonded hydrogen with SiC-bonded radicals having an aliphatic carbon-carbon multiple bond.

6. The organopolysiloxane composition of claim 3, wherein the organopolysiloxane composition contains from 1 to 60% by weight of the organo(poly)siloxane of claim 1, based on the total weight of the organopolysiloxane composition.

7. A process for preparing the organo(poly)siloxanes of claim 1, which comprises reacting an α-hydroxyorgano(poly)siloxane of the formula $$R^2 R_2 Si[OSiR_2]_n OH \qquad (II)$$

with a silane of the formula $$(R^1O)_a HSiR_{2-a} X \qquad (III)$$

in which R and R$^2$ are in each case monovalent hydrocarbon radicals or substituted monovalent hydrocarbon radicals, R$^1$ is a monovalent hydrocarbon radical or a substituted monovalent hydrocarbon radical, X is an easily removable group, n is an integer of at least 2 and a is 1 or 2.

8. The process of claim 7, wherein the α-hydroxyorgano(poly)siloxane of formula (II) is reacted with a silane of formula (III) in the presence of a catalyst.

9. A method for improving the adhesion of organopolysiloxane elastomers to substrate which comprises adding the organo(poly)siloxane of claim 1 to an organopolysiloxane composition which can be crosslinked to form an elastomer.

* * * * *